United States Patent
Torres et al.

(10) Patent No.: US 9,918,042 B2
(45) Date of Patent: Mar. 13, 2018

(54) PERFORMING ELECTRONIC CONFERENCING OPERATIONS USING ELECTRONIC PORTALS AT DIFFERENT LOCATIONS

(71) Applicant: GetGo, Inc., Boston, MA (US)

(72) Inventors: Adan Torres, Palo Alto, CA (US); Akshaya Venkatesan, Goleta, CA (US)

(73) Assignee: GetGo, Inc., Boston, MA (US)

( * ) Notice: Subject to any disclaimer, the term of this patent is extended or adjusted under 35 U.S.C. 154(b) by 0 days.

(21) Appl. No.: 15/142,320

(22) Filed: Apr. 29, 2016

(65) Prior Publication Data

US 2017/0318260 A1 Nov. 2, 2017

(51) Int. Cl.
| | |
|---|---|
| *H04N 7/15* | (2006.01) |
| *H04L 29/06* | (2006.01) |
| *H04L 29/08* | (2006.01) |
| *G06F 3/16* | (2006.01) |
| *H04N 7/14* | (2006.01) |

(52) U.S. Cl.
CPC .............. *H04N 7/15* (2013.01); *G06F 3/165* (2013.01); *H04L 65/403* (2013.01); *H04L 67/10* (2013.01); *H04L 67/18* (2013.01); *H04N 7/147* (2013.01)

(58) Field of Classification Search
USPC .................................................... 348/14.08
See application file for complete search history.

(56) References Cited

U.S. PATENT DOCUMENTS

| | | | |
|---|---|---|---|
| 2010/0205667 A1* | 8/2010 | Anderson | G06F 3/013 |
| | | | 726/19 |
| 2011/0107220 A1 | 5/2011 | Perlman | |
| 2012/0144320 A1* | 6/2012 | Mishra | H04N 7/155 |
| | | | 715/753 |
| 2014/0267548 A1* | 9/2014 | Yee | G06F 3/017 |
| | | | 348/14.03 |
| 2014/0362163 A1 | 12/2014 | Winterstein et al. | |
| 2015/0141145 A1 | 5/2015 | Perlman et al. | |
| 2015/0201278 A1* | 7/2015 | Bao | H04R 3/005 |
| | | | 381/92 |

* cited by examiner

*Primary Examiner* — Amal Zenati
(74) *Attorney, Agent, or Firm* — BainwoodHuang

(57) ABSTRACT

A technique performs electronic conferencing operations. The technique involves electronically conveying video of a local environment from local conferencing equipment (e.g., a local electronic portal) to remote conferencing equipment (e.g., a remote electronic portal) while electronically muting audio of the local environment. The technique further involves, while the video of the local environment is electronically conveyed from the local conferencing equipment to the remote conferencing equipment and while the audio of the local environment is electronically muted, detecting a user gesture within the local environment, the user gesture being detected electronically in a contactless manner. The technique further involves, in response to detection of the user gesture within the local environment, electronically unmuting the audio of the local environment.

24 Claims, 7 Drawing Sheets

PERFORMING ELECTRONIC CONFERENCING OPERATIONS USING ELECTRONIC PORTALS AT DIFFERENT LOCATIONS

BACKGROUND

In a conventional online meeting, meeting participants connect their client devices to an online meeting server which hosts the online meeting. Suitable client devices include desktop computers, tablets, and smartphones.

Once the meeting participants have connected their client devices to the online meeting server, the meeting participants are able to view meeting content such as slides of a slide show, pages of a document, and head shots captured by webcams. Additionally, the meeting participants are able to share voice input, i.e., voice feeds from the meeting participants are combined into an aggregate feed which is sent to each client device. Accordingly, the online meeting provides for a collaborative exchange among the meeting participants even though the meeting participants may reside in different locations.

SUMMARY

Situations may arise in which distributed teams of workers need to collaborate on one or more tasks. For example, a small company may outgrow its original office space and open one or more satellite offices. As another example, an enterprise in one location may merge with another enterprise in another location with the goal of maintaining operations at both locations. As yet another example, different entities (i.e., separate companies, organizations, etc.) may need to work closely together on a project from their respective workplaces.

Unfortunately, distributed teams often have difficulty working together. Along these lines, members of different teams often do not feel connected with one another given the fact that they are not co-located, and thus do not communicate with each other as often as with members of their own team at a single location. Additionally, distributed teams can suffer from a lack of empathy toward members of another team due to not knowing the members of the other team as well as the members of their own team. Furthermore, co-located team members may frequently have informal sidebar conversations resulting in significant work advancements (e.g., impulsive sharing of thoughts, asking questions, etc.), and such informal sidebar conversations are unavailable between team members who are not co-located.

One possible approach to augmenting collaboration between distributed teams involves the member of each team joining an "always on" online meeting from that member's client device (e.g., desktop computer, tablet, smartphone, etc.). That is, each member could join the same online meeting and leave that online meeting turned on all day to allow the members to continuously talk with each other and share content. Unfortunately, such a situation could become extremely distracting, decrease efficiency in certain ways, and operate as an intrusion on each member's privacy.

Another possible approach to augmenting collaboration between distributed teams involves dedicating one desktop computer as an online meeting endpoint at each team location. Here, the dedicated desktop computer at each team location would be left in an "always on" state in which user I/O from each location is constantly transmitted to the other location. Accordingly, a member of one team at one location could speak aloud to a member of another team at another location at any time if the members happened to see each other passing by the dedicated desktop computers at their respective locations. Unfortunately, if the desktop computer at each location is left in the "always on" state, the sound conveyed from each location to the other location would still become a nuisance and eventually someone might need to take on the burdensome task of manually managing the audio sound level at each dedicated desktop computer.

Fortuitously, improved techniques are directed to performing conferencing operations using electronic portals at different locations. In particular, such electronic portals continuously exchange video of their respective locations thus providing the "feel" of being in the same office even though the electronic portals reside in different locations (e.g., different floors/wings of a building, different buildings of the same campus, different towns/states/countries entirely, etc.). However, the electronic portals do not continuously exchange audio of their respective locations thus avoiding nuisance noise. Rather, when an electronic portal at one location detects a particular user gesture within a local environment of that location (e.g., a user entering an engagement zone, a hand wave, a recognized voice command, etc.), the electronic portal unmutes the audio between electronic portals thus enabling the electronic portals to share audio. Such operation of electronic portals enables colleagues at the different locations to feel closer to each other, i.e., as if they are working "under the same roof." Moreover, such operation of electronic portals enables colleagues to engage in informal sidebar conversations, e.g., when people at different locations happen to walk by the electronic portals in a manner similar to that of bumping into each other in the hallway. Accordingly, such electronic portals promote communication between teams and provide opportunities for greater working efficiencies than distributed teams which communicate less frequently.

One embodiment is directed to a method of performing electronic conferencing operations. The method includes electronically conveying video of a local environment from local conferencing equipment to remote conferencing equipment while electronically muting audio of the local environment. The method further includes, while the video of the local environment is electronically conveyed from the local conferencing equipment to the remote conferencing equipment and while the audio of the local environment is electronically muted, detecting a user gesture within the local environment, the user gesture being detected electronically in a contactless manner. The method further includes, in response to detection of the user gesture within the local environment, electronically unmuting the audio of the local environment.

In some arrangements, the local conferencing equipment includes a local set of cameras to acquire the video of the local environment, a local set of microphones to acquire the audio of the local environment, and local control circuitry. In these arrangements, detecting the user gesture within the local environment includes electronically sensing, by the local control circuitry, occurrence of a physical event within the local environment.

In some arrangements, images of the local environment are captured by the local set of cameras of the local conferencing equipment and rendered by the remote conferencing equipment. In these arrangements, sound from the local environment is captured by the local set of microphones of the local conferencing equipment but blocked from being output by the remote conference equipment before and during electronically sensing the occurrence of the physical event within the local environment. Along these lines, such blocking may be performed by the local conference equipment, by an intermediate device (e.g., a conferencing server), or by the remote conference equipment.

In some arrangements, the local control circuitry includes a depth sensor. In these arrangements, electronically sensing the occurrence of the physical event within the local environment includes detecting, as the physical event, movement of a user into an engagement zone which is monitored by the depth sensor.

In alternative arrangements, the local control circuitry includes recognition circuitry. Here, the electronically sensing the occurrence of the physical event within the local environment may include recognizing, as the physical event and by the recognition circuitry, a user's hand wave gesture. Alternatively, electronically sensing the occurrence of the physical event within the local environment may also include recognizing, as the physical event and by the recognition circuitry, particular speech provided by a user.

In some arrangements, the local conferencing equipment further includes (i) a large display screen disposed and operative in a portrait orientation in which a measured height of the large display screen is greater than a measured width of the large display screen while the large display screen is disposed and operating in the portrait orientation. The local conferencing equipment further includes a local set of speakers. In these arrangements, the method further includes outputting, by the large display screen, video acquired from a remote set of cameras of the remote conferencing equipment, and outputting, by the local set of speakers, audio acquired from a remote set of microphones of the remote conferencing equipment.

In some arrangements, outputting the video acquired from the remote set of cameras of the remote conferencing equipment includes rendering, on the large display screen of the local conferencing equipment, images of a remote environment. The remote environment is proximate to the remote conferencing equipment and distant to the local conference equipment. Additionally, the local environment is proximate to the local conferencing equipment and distant to the remote conference equipment.

In some arrangements, rendering the images of the remote environment occurs while the video of the local environment is electronically conveyed from the local conferencing equipment to the remote conferencing equipment regardless of whether the audio of the local environment is electronically muted. Here, the continuous video is no more bothersome or distracting than a view of an adjacent hallway, cubical, conference room, etc.

In some arrangements, outputting the audio acquired from the remote set of microphones of the remote conferencing equipment includes providing, from the local set of speakers of the local conferencing equipment, sound from the remote environment. Along these lines, providing the sound from the remote environment may occur after electronically sensing occurrence of the physical event within the local environment. Additionally, providing the sound from the remote environment may occur after electronically sensing occurrence of a physical event within the remote environment.

In some arrangements, the method may further include outputting, as a notification, an audio alert immediately before providing the sound from the remote environment. For example, the equipment may output a chime, a series of tones, etc. just prior to unmuting the audio.

In some arrangements, the method further includes, after the audio of the local environment is electronically unmuted so that both audio and video of the local environment are electronically conveyed from the local conferencing equipment to the remote conferencing equipment, electronically re-muting the audio of the local environment in response to an event. For example, electronically re-muting may occur in response to a determination that, for at least a predefined amount of time, (i) a local user has left a local engagement zone of a local environment for the local conferencing equipment and (ii) a remote user has left a remote engagement zone of a remote environment for the remote conferencing equipment.

In some arrangements, the method further includes providing a menu of multiple remote environments. In these arrangements, the method further includes, after the menu is provided, receiving a selection of a particular remote environment of the multiple remote environments and, in response to selection of the particular remote environment, displaying video of the particular remote environment, the remote conferencing equipment residing at the particular remote environment.

In some arrangements, the method further includes, after the audio of the local environment is electronically unmuted, receiving a content access command by the local control circuitry. In these arrangements, the method further includes, in response to the content access command, simultaneously outputting content on local conference equipment and the remote conferencing equipment.

Another embodiment is directed to a computer program product having a non-transitory computer readable medium that stores a set of instructions to perform electronic conferencing operations. The set of instructions, when carried out by local conferencing equipment, causes the local conferencing equipment to perform a method of:

(A) electronically conveying video of a local environment from the local conferencing equipment to remote conferencing equipment while electronically muting audio of the local environment;

(B) while the video of the local environment is electronically conveyed from the local conferencing equipment to the remote conferencing equipment and while the audio of the local environment is electronically muted, detecting a user gesture within the local environment, the user gesture being detected electronically in a contactless manner; and (C) in response to detection of the user gesture within the local environment, electronically unmuting the audio of the local environment.

In some arrangements, unmuting is performed in both directions in response to detection of the user gesture. That is, when the audio of the local environment is unmuted so that a remote user at the remote conferencing equipment can hear a local user at the local conferencing equipment, audio from the remote user's environment is also unmuted so that the local user can hear the remote user.

Yet another embodiment is directed to local conferencing equipment which includes a communications interface, memory, and control circuitry coupled to the communications interface and the memory. The memory stores instructions that, when carried out by the control circuitry, cause the control circuitry to:

(A) electronically convey video of a local environment from the control circuitry of the local conferencing equipment to remote conferencing equipment through the communications interface of the local conferencing equipment while electronically muting audio of the local environment;

(B) while the video of the local environment is electronically conveyed to the remote conferencing equipment and while the audio of the local environment is electronically muted, detect a user gesture within the local environment, the user gesture being detected electronically in a contactless manner; and (C) in response to detection of the user gesture within the local environment, electronically unmute the audio of the local environment.

It should be understood that, in the cloud context, some electronic circuitry may be formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in performing electronic conference operations using electronic portals at different locations.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing conferencing operations using electronic portals at different locations. Along these lines, such electronic portals continuously exchange video of their respective locations thus providing the "feel" of being in the same setting even though the electronic portals reside in different locations (e.g., different floors/wings of a building, different buildings of the same campus, different towns/states/countries entirely, etc.). However, the electronic portals do not continuously exchange audio of their respective locations thus avoiding nuisance noise. Rather, when an electronic portal at one location detects a particular user gesture within a local environment of that location (e.g., a user entering an engagement zone, a user's hand wave, a recognized voice command, etc.), the electronic portal automatically unmutes the audio between electronic portals thus enabling the electronic portals to share audio. Such operation of electronic portals enables colleagues at the different locations to feel closer to each other, i.e., as if they are working together "under the same roof." Moreover, such operation of electronic portals enables colleagues to engage in informal sidebar conversations, e.g., when people at different locations happen to walk by the electronic portals in a manner similar to that of bumping into each other in the hallway. As a result, such electronic portals promote communication between distributed groups of people and provide opportunities for greater working efficiencies compared to distributed teams which communicate less frequently.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
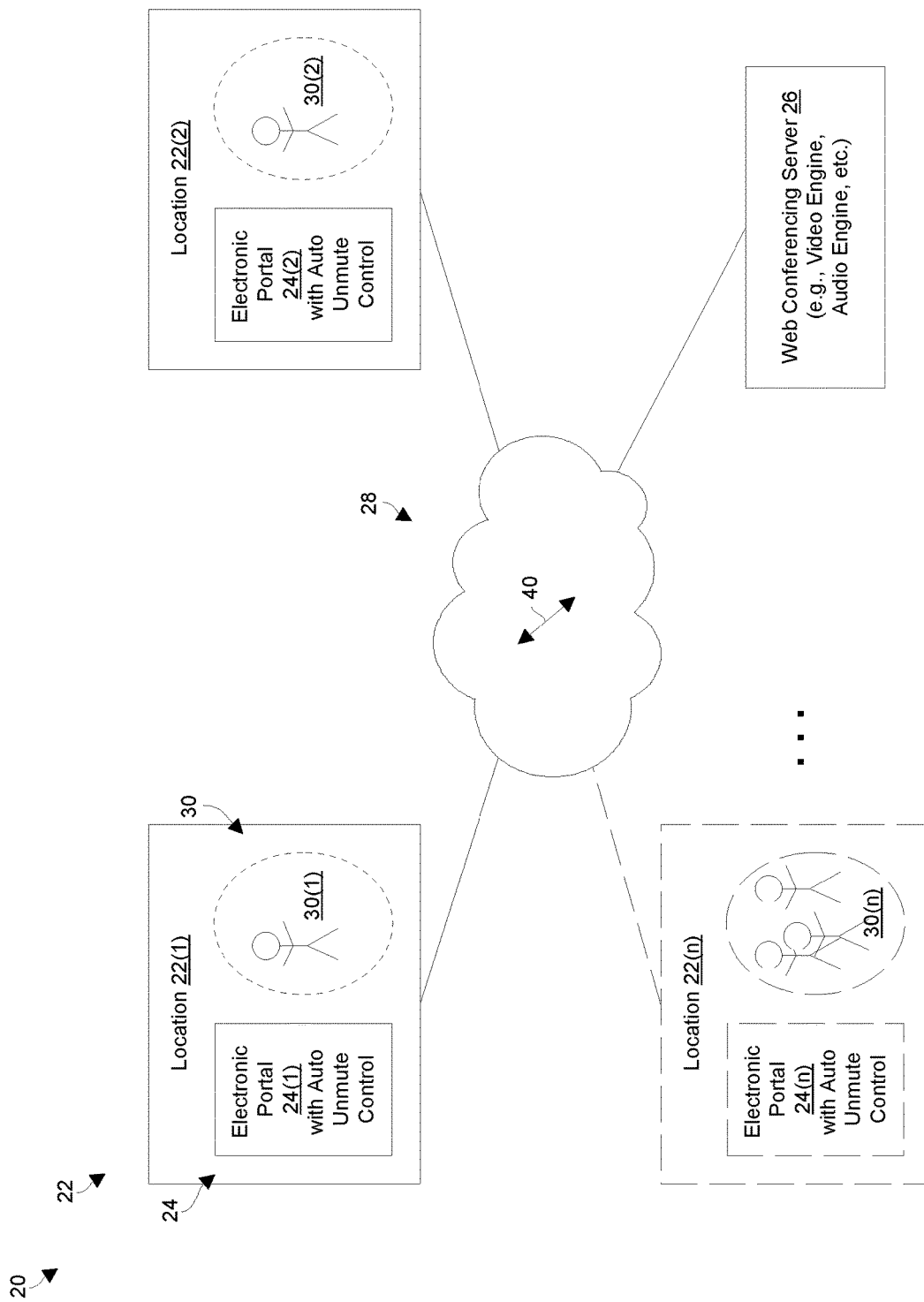
FIG. 1 is a block diagram of a conferencing system that uses electronic portals.

FIG. 1 is a block diagram of a conferencing system 20 that facilitates electronic communications between different locations 22. The conferencing system 20 includes electronic portals 24, a web conferencing server 26, and a communications medium 28. The electronic portal 24(1) resides at location 22(1), the electronic portal 24(2) resides at location 22(2), and so on.

Each electronic portal 24 is constructed and arranged to provide audio and video from a respective engagement zone 30 to other electronic portals 24, as well as output audio and video received from the other electronic portals 24. As will be explained in further detail shortly, the electronic portals 24 render video from other electronic portals 24 in an ongoing manner while automatically unmuting/muting audio in response to detected events (e.g., user hand gestures, users entering/exiting engagement zones 30, etc.). As shown in FIG. 1, the electronic portal 24(1) oversees engagement zone 30(1) at the location 22(1), the electronic portal 24(2) oversees engagement zone 30(2) at the location 22(2), and so on.

The web conferencing server 26 is constructed and arranged to coordinate distribution of the audio and video among the various electronic portals 24. The web conferencing server 26 may further host web conferences among client devices (e.g., desktop computers, tablets, smartphones, etc.) of conference participants. In some arrangements, the web conferencing server 26 is configured to combine audio and video from one or more electronic portals 24 with the audio and video from standard web conferences to provide hybridized collaboration sessions.

It should be understood that the web conferencing server 26 may actively perform specialized content processing operations (e.g., a video engine to distribute/adjust/etc. video content, an audio engine to mix/distribution/etc. audio content, integration of web-based services with cellular service/plain old telephone service (POTS)/etc., and so on). Alternatively, the web conferencing server 26 may mainly manage access control (e.g., portal/user registration, portal/user profiles, etc.) and the electronic portals 24 directly coordinate their operation via point-to-point communications.

In some arrangements, the web conferencing server 26 is formed by multiple computers organized in a cluster. In other arrangements, the web conferencing server 26 is formed by a server farm. In yet other arrangements, the web conferencing server 26 is formed by distributed circuitry, i.e., the online collaboration server 26 is located in the "cloud".

The communications medium 28 is constructed and arranged to connect the various components of the conferencing system 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, cellular communications, POTS communications, combinations thereof, and so on.

During operation, the electronic portals 24 continuously share video with each other. Such operation thus provides the "feel" of being in the same physical environment even though the electronic portals 24 reside in the different physical locations 22.

However, the electronic portals 24 do not continuously exchange audio of their respective locations 22. Accordingly, the electronic portals 24 do not operate as constant noise distractions that pose nuisances. Rather, the electronic portals 24 initially mute the audio. Then, when an electronic portal 24 at one location 22 detects a particular user gesture or event within a local environment (e.g., the engagement zone 30) of that location, the electronic portal 24 unmutes the audio between electronic portals 24 thus enabling the electronic portals 24 to share audio in a manner similar to that of team members informally meeting each other in a hallway, an office isle intersection, a reception area, etc.

In some arrangements, the audio is unmuted at both electronic portals 24 simultaneously in response to a user gesture or event in the engagement zone 30 at one electronic portal 24. In other arrangements, the audio is unmuted just at the local electronic portal 24 in response to a user gesture or event in the local engagement zone 30, and the audio at the remote electronic portal 24 must be unmuted separately in response to another user gesture or other event in the remote engagement zone 30. In some arrangements, the unmuting of audio is preceded with an audio indicator (e.g., a pleasant chime or bell sound) to inform the local participant that the audio is now turned on.

Once the audio has been unmuted, humans within the engagement zones 30 are able to freely talk with each other in manner similar to that of physically standing next to each other. That is, the electronic portals 24 provide relatively large video displays for substantially life size video (e.g., +/−10%) and volume control that approximates normal human conversation levels (e.g., 70 dB+/−10%).

The electronic portals 24 continue to share audio until the humans leave both engagement zones 30. Accordingly, if only one engagement zone 30 subsequently becomes vacant (e.g., a person temporarily steps outside the engagement zone 30 to get something), the audio in both directions remains unmuted. However, once both engagement zones 30 simultaneously become vacant for a predefined amount of time (e.g., three seconds, five seconds, 10 seconds, etc.), the electronic portals 24 automatically re-mute their audio thus returning each electronic portal 24 to its initial state of simply outputting video while muting audio. Further details will now be provided with reference to FIG. 2.

Figure 2:
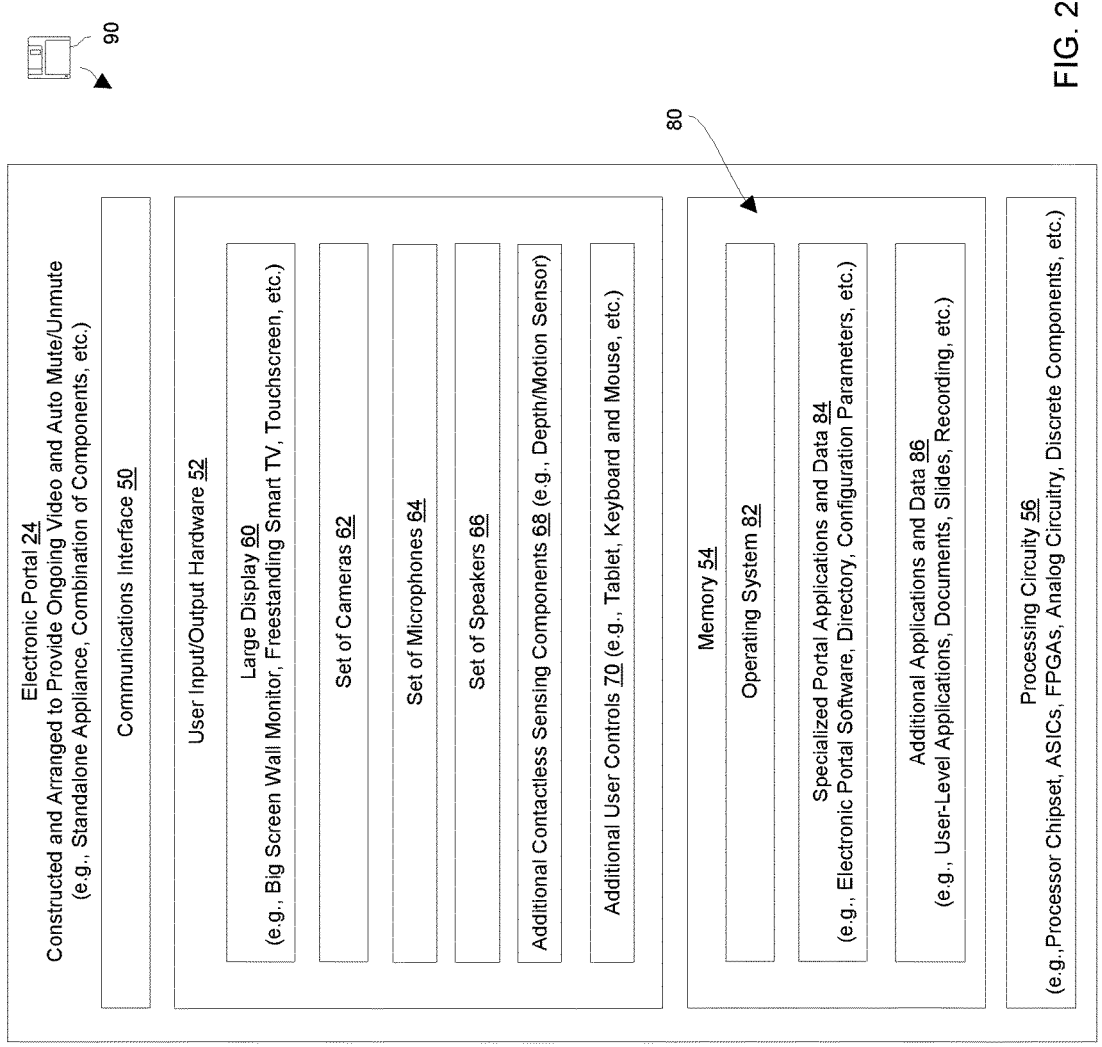
FIG. 2 is a block diagram of particular details of an electronic portal of FIG. 1.

FIG. 2 is a block diagram of particular details of an electronic portal 24. The electronic portal 24 includes a communications interface 50, user input/output (I/O) hardware 52, memory 54, and processing circuitry 56.

The communications interface 50 is constructed and arranged to connect the electronic portal 24 to the communications medium 28 (FIG. 1). Accordingly, the communications interface 70 enables the electronic portal 24 to communicate with the other components of the conferencing system 20. Such communications may be line-based or wireless (i.e., IP-based, POTS-based, cellular, fiber optic, combinations thereof, and so on).

The user input/output I/O hardware 52 includes a large display 60, a set of (i.e., one or more) cameras 62, a set of microphones 64, a set of speakers 66, additional contactless sensing components 68, and additional user controls 70. The large display 60 is constructed and arranged to render video to a local environment (e.g., an engagement zone 30, also see FIG. 1). The set of cameras 62 is constructed and arranged to obtain video of the local environment of the electronic portal 24. The set of microphones 64 is constructed and arranged to obtain audio of the local environment of the electronic portal 24. The set of speakers 64 is constructed and arranged to provide audio to the local environment of the electronic portal 24. The additional contactless sensing components 68 represent other contactless I/O circuitry, e.g., a set of depth and/or motion sensors to detect human presence and/or user gestures within the local engagement zone 30. The additional user controls 70 represent further user controls such as a tablet having a touchscreen, a keyboard and mouse, and so on.

The memory 54 is intended to represent both volatile storage (e.g., DRAM, SRAM, etc.) and non-volatile storage (e.g., flash memory, magnetic disk drives, etc.). The memory 54 stores a variety of software constructs 80 including an operating system 82, specialized portal applications and data 84, and additional applications and data 86.

The processing circuitry 56 is constructed and arranged to operate in accordance with the various software constructs 80 stored in the memory 54. In particular, the processing circuitry 56, when executing the operating system 82, manages various resources of the electronic portal 24 (e.g., memory allocation, processor cycles, hardware compatibility, etc.). Additionally, the processing circuitry 56 operating in accordance with the specialized portal applications and data 84 forms specialized control circuitry to perform particular portal/conferencing operations such as capturing video and audio from the local engagement zone 30, automatic unmuting and muting of the audio, and so on. Furthermore, the processing circuitry 56, when executing the additional applications and data 86 enables the electronic portal 24 to perform ancillary operations such as sharing content of a document or slides, recording a session, taking a picture, etc.

It should be understood that the above-mentioned processing circuitry 56 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic portal 24. The computer program product 90 has a non-transitory and non-volatile computer readable medium that stores a set of instructions to control one or more operations of the electronic portal 24. Examples of suitable computer readable storage media include tangible articles of manufacture and apparatus that store instructions in a non-volatile manner such as CD-ROM, flash memory, disk memory, tape memory, and the like.

It should be understood that one or more of the particular components of the electronic portal 24 may be tightly integrated. For example, a large smart television or touchscreen monitor may provide the large display 60 as well as the communications interface 60 and/or the additional user controls 70. As another example, a game controller which is equipped with an RGB camera, a depth sensor (e.g., an array of infrared sensors), a set of microphones, etc. such as the Kinect product by Microsoft Corporation is suitable for use as one or more of the user I/O components, and so on. In some arrangements, the electronic portal 24 is provided as a single form factor appliance that can be hung on a wall or set up in a free standing manner. As yet another example, a microphone and camera can be integrated into a single peripheral attachment such as a standard webcam. Further details will now be provided with reference to FIG. 3.

Figure 3:
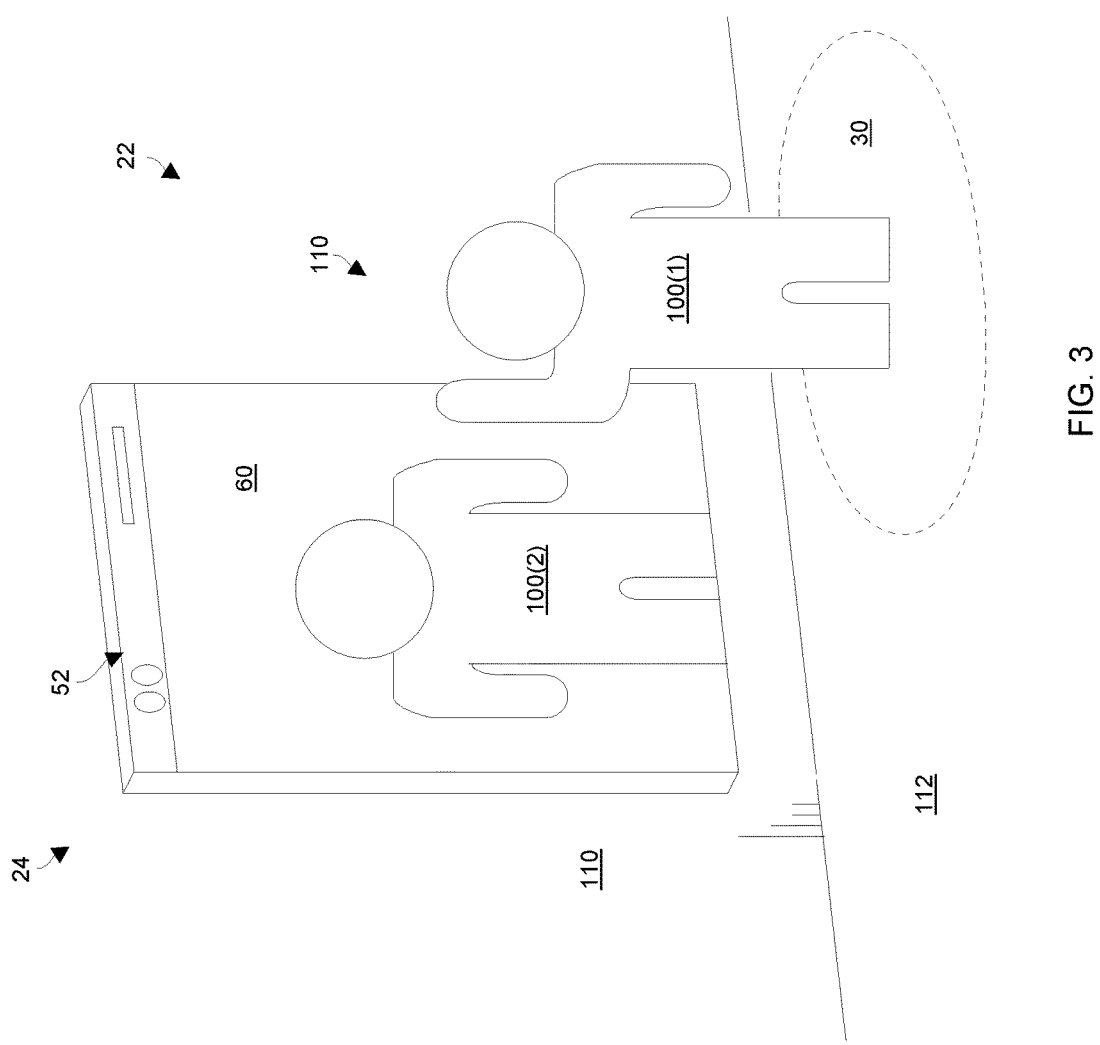
FIG. 3 is a perspective view of a human standing in front of the electronic portal of FIG. 2.

FIG. 3 shows a perspective view of an electronic portal 24 in use during a collaborative exchange between two people. Here, the electronic portal 24 is installed at a particular physical location 22 and is configured to monitor an engagement zone 30. During this exchange, a local participant 100(1) is standing within the engagement zone 30. A similar situation exists at a remote physical location 22 for a remote participant 100(2).

By way of example only, the electronic portal 24 takes the form of an appliance which hangs on a wall 110. Perhaps the wall 110 forms part of a common area 112 which is frequented by people routinely. Alternatively, the large display 60 is free standing. Examples of suitable settings for such a common area 112 include an open area of an office space, a hallway or isle, a copy room, a study/library/conference room, a kitchenette area, a lab room, a reception area, and the like.

As shown in FIG. 3, the large display 60 is relatively life size, e.g., having a diagonal of at least 50 inches. In this use case, the large display 60 hangs in a portrait orientation so that the large display 60 is taller than it is wide, i.e., the measured height of the large display 60 is greater than the measured width of the large display 60. Such an orientation enables the participants 110 to have more a personable conversation than a landscape orientation.

As further shown in FIG. 3, at least some of the user I/O hardware 52 is appropriately positioned relative to the engagement zone 30 for optimized capture of video, audio, user gestures, and so on from a human standing in the engagement zone 30 (i.e., a region centered in front of the large display 60). Although the user I/O hardware 52 is shown above the large display 60, the user I/O hardware 52 may be to one side of the large display 60, on both sides of the large display 60, in front of the large display 60, in different locations, and so on.

It should be understood that the engagement zone 30 can be set to be any size, e.g., small for just one person, large for multiple people (see location 22(n) in FIG. 1), etc. In some arrangements, a 180 degree camera or a 360 degree camera assembly enables each remote location 22 to look around. In some locations, the content in the background (e.g., at some predefined distance away) is blurred to provide some privacy. Further details will now be provided with reference to FIGS. 4 and 5.

Figure 4:
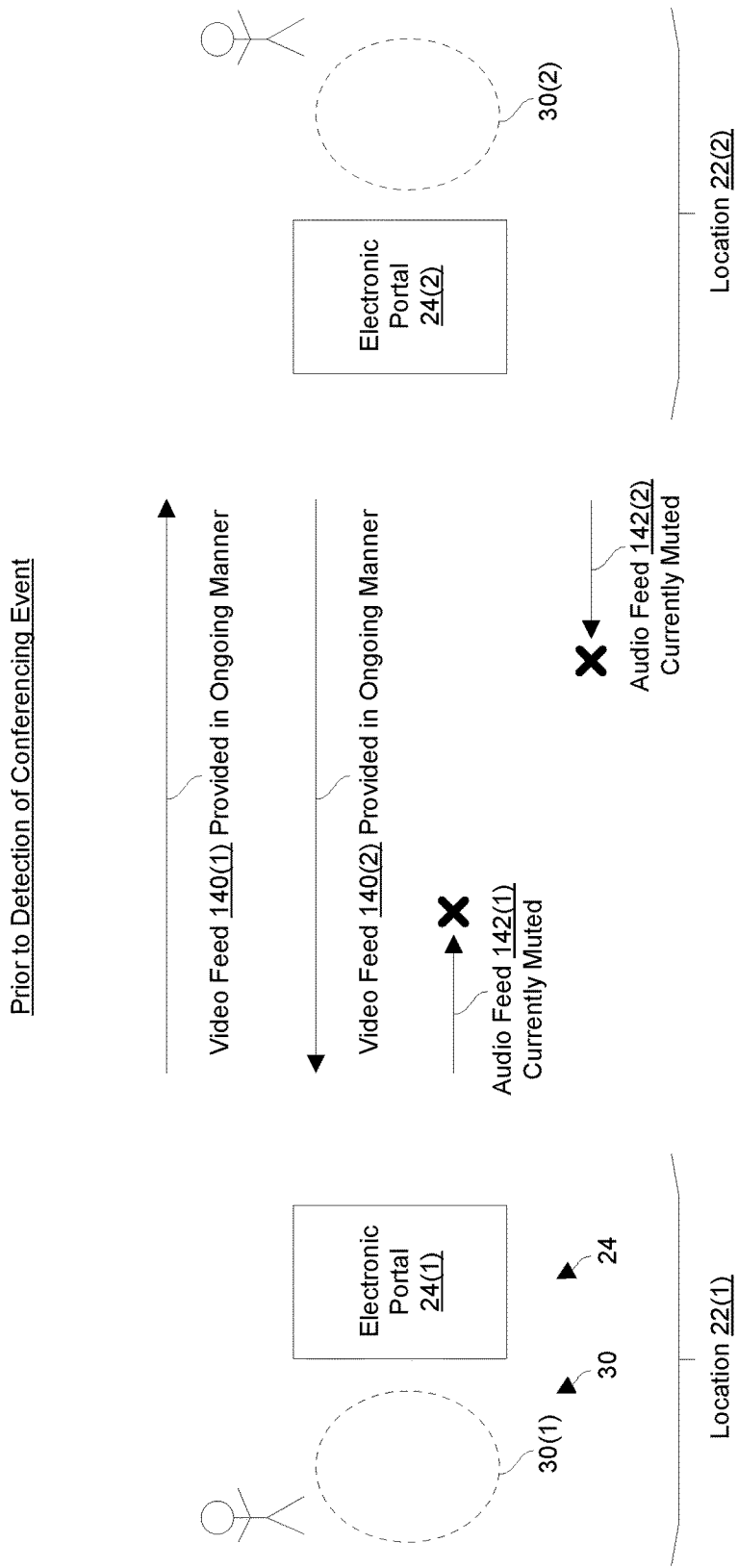
FIG. 4 is a block diagram of two electronic portals during a first operating phase.
Figure 5:
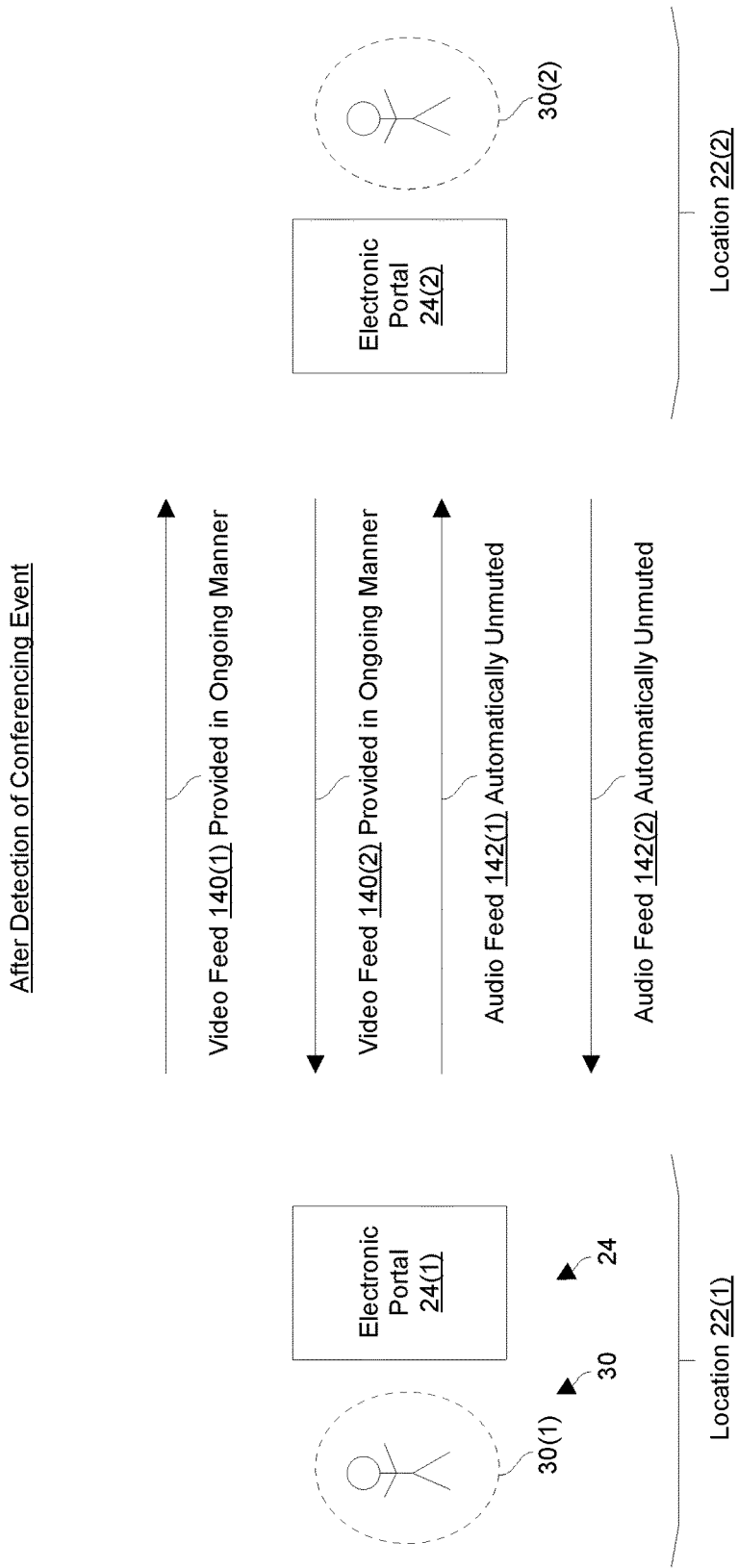
FIG. 5 is a block diagram of the two electronic portals during a second operating phase.

FIGS. 4 and 5 illustrate particular phases of electronic portal operation. In particular, FIG. 4 shows two electronic portals 24 during an initial operating phase. FIG. 5 shows the two electronic portals 24 during a subsequent operating phase. It should be understood that the web conferencing server 26 and the communications medium 28 are purposefully omitted from FIGS. 4 and 5 for simplicity. Nevertheless, it should be understood that the communications medium 28 is present (also see FIG. 1) and operates as a conduit for carrying portal communications (e.g., see electronic signals 40 in FIG. 1). Additionally, at least in some arrangements, the web conferencing server 26 is present (FIG. 1) and performs at least some electronic conferencing operations.

As shown in FIGS. 4 and 5, the electronic portals 24 reside at respective locations 22 and monitor respective engagement zones 30. In particular, the electronic portal 24(1) resides at location 22(1) and monitors engagement zone 30(1) for events. Likewise, the electronic portal 24(2) resides at location 22(2) and monitors engagement zone 30(2) for events.

Additionally, as shown in both FIGS. 4 and 5, video from each location 22 is shared with the other location 22 during both phases of operation. That is, the electronic portal 24(1) provides a video feed 140(1) of the engagement zone 30(1) to the electronic portal 24(2) which displays that video feed 140(2). Similarly, the electronic portal 24(2) provides a video feed 140(2) of the engagement zone 30(2) to the electronic portal 24(1) which displays that video feed 140(1). Accordingly, users that are not currently standing in either engagement zone 30 but that can see the large display 60 of an electronic portal 24 perceive themselves as being closer to the location 22 of the other electronic portal 24. Such operation tends to provide users at each location 22 with more of a sense of being at the other location 22.

Now, with reference to FIG. 4, it should be understood that the audio is initially muted by the electronic portals 24 because there are no users in the engagement zones 30. Accordingly, there is are no sounds initially outputted by the electronic portals 24. As a result, there is no noise distraction that could otherwise pose as a nuisance. In some arrangements, such muting of the audio is performed at the source, i.e., the electronic portal 24(1) blocks transmission of the audio feed 142(1), and the electronic portal 24(2) blocks transmission of the audio feed 142(2). In other arrangements, such muting of the audio is performed at a location other than the source (e.g., at each destination electronic portal 24, at the web conferencing server 26, etc.).

It should be understood that while the electronic portals 24 share video but mute audio, the electronic portals 24 continuously monitor their respective engagement zones 30 for user activity. In particular, the electronic portals 24 await a triggering event which directs the electronic portals 24 to automatically unmute the audio and thus enable users of the electronic portals 24 to conduct a conversation.

Examples of triggering events include one user stepping into an engagement zone 30, one user waving a hand after stepping into an engagement zone 30, one user speaking a particular word or phrase such as "hello" or "hi there" while standing in an engagement zone 30, combinations thereof, and so on. Recall that, in connection with FIG. 2, each electronic portal 24 is equipped with certain user I/O hardware 52 that enables detection of such an event (e.g., a camera, a depth sensor, a microphone, etc.). Moreover, the processing circuitry 56 may be configured to perform various event detection operations, e.g., facial recognition to determine whether a user is looking at a large display 60, voice recognition to identify user commands, etc.

As shown in FIG. 5, once the appropriate triggering event has been detected, the electronic portals 24 automatically unmute the audio feeds 142(1), 142(2) thus enabling each electronic portal 24 to output sound from the other electronic portal 24. There is no manual control of the unmute/mute feature required. Rather, the users simply enter the engagement zones 30 and perhaps provide user gestures which turn on the audio in a contactless manner. Accordingly, the users are then able to robustly and reliably engage in conversation automatically (i.e., without manually operating the electronic portals 24). In some arrangements, the electronic portals 24 output an alert or notification in response to the triggering event and just before unmuting the audio. Such an alert may take the form of a pleasant sounding audio tone, chime, bell, series of musical notes, and so on. At this same time, the large display 60 may provide a temporary or sustained notification that audio is unmuted (e.g., a flashing or sustained dot, a speaker icon, etc.).

Such operation enables different groups of people residing at the different locations 22 to feel connected even though they are not physically co-located. Additionally, members of each group will be able to develop empathy for members of the other group since they will see the other group members more often as well as get to know the other group members. Furthermore, the members of the different groups will be able to enter into informal sidebar conversations which will promote impulsive sharing of thoughts, asking questions, and other significant work advancements.

To terminate an engagement session, the users may simply leave their respective engagement zones 30 for a predefined period of time (e.g., a few seconds). Once the electronic portals 24 determine that both engagement zones 30 are unoccupied for the predefined period of time, the electronic portals 24 automatically re-mute the audio (see FIG. 4 again). It should be understood that the predefined period of time can be manually or automatically tuned, modified, adjusted, etc. over time to avoid spurious, undesired, or unintentional re-muting as users move or temporarily step aside from their engagement zones 30 for various reasons. In some arrangements, just prior to re-muting, the electronic portals 24 output an alert to inform the users that the audio is about to be re-muted. Further details will now be provided with reference to FIG. 6.

Figure 6:
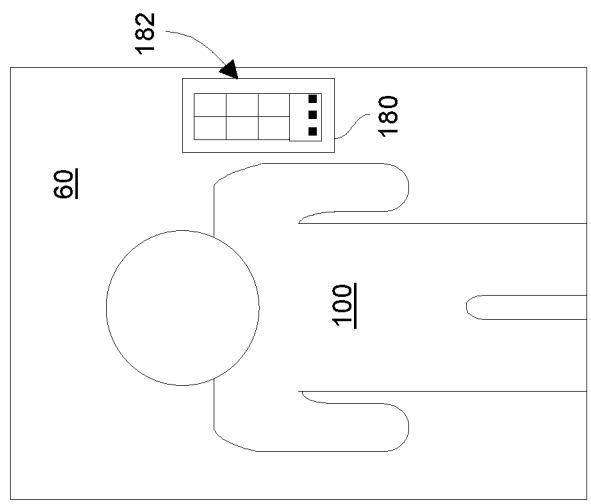
FIG. 6 is a view of a display of the electronic portal of FIG. 2.

FIG. 6 shows particular details of an electronic portal 24. As shown, the large display 60 renders video of a local environment captured by another electronic portal 24. The video, which is provided continuously (e.g., always on), may include the image of one or more users 100 residing in the engagement zone 30 of the other electronic portal 24.

In some arrangements, the large display 60 is formed by a large touchscreen that is capable of not only displaying video, but also receiving user touch input. In these arrangements, the large touchscreen displays a touch sensitive user interface 180 (e.g., at a convenient hand height) which provides a control panel 182 to enable a user standing in front of the electronic portal 25 to enter commands (see FIG. 6).

In other arrangements, the electronic portal 24 includes a side peripheral device that provides the touch sensitive user interface 180 having the control panel 182. An example of such a side peripheral device is a tablet which is disposed at hand height physically adjacent to the large display 60 (see FIG. 6).

In yet other arrangements, the electronic portal 24 is equipped with a physical user interface 180 which includes a keyboard and mouse that enables the local user to control operations in a desktop navigational manner. Other configuration are suitable for use as well, e.g., physical buttons, a remote controller (e.g., via Bluetooth), combinations thereof, etc.

With any of the above-described user interfaces 180 available, the user standing in front of the electronic portal 24 is able to not only have a conversation with another user at another electronic portal 24, but also able to share other information. For example, the local user is able to access and display a document, a slide show, a spreadsheet, a picture, a movie, etc. by navigating a filesystem using the user interface 180.

Also, the local user is able to navigate to other electronic portals 24, send messages (e.g., emails, text messages, etc.), schedule or open online meetings, operate specialized applications, and so on, using the user interface 180. To this end, the local user is able to view video from multiple electronic portals 24 on the large display 60, e.g., simultaneously in an array, serially as a slide show where the video from each electronic portal 24 is displayed for a few seconds, combinations thereof, etc. (Also see the location 22(n) having an electronic portal 24(n) to monitor an engagement zone 30(n) in FIG. 1.) Such video from the multiple electronic portals 24 can be rendered in a main pane of the large display 60 or alternatively in a secondary pane, e.g., on the side, in an upper corner, and so on. Further details will now be provided with reference to FIG. 7.

Figure 7:
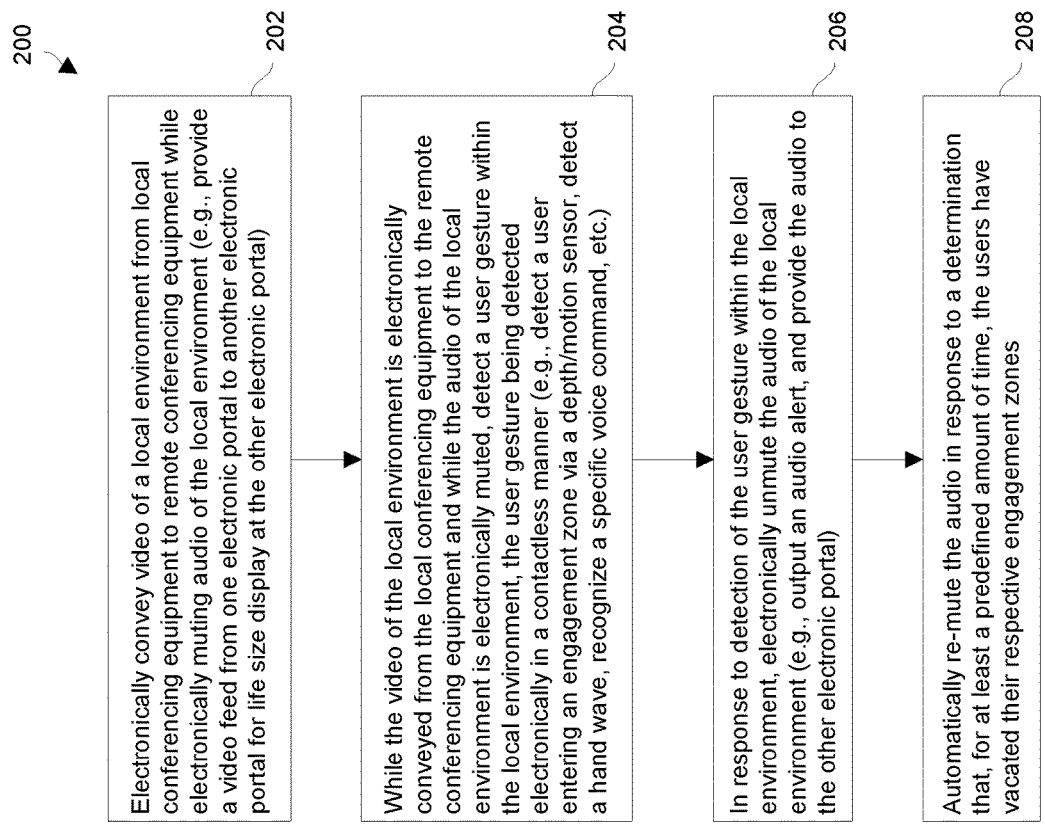
FIG. 7 is a flowchart of a procedure that is performed by the conferencing system of FIG. 1.

FIG. 7 is a flowchart of a procedure 200 that is performed by the conferencing system 20 of FIG. 1. At 202, the conferencing system 20 electronically conveys video of a local environment from local conferencing equipment to remote conferencing equipment while electronically muting audio of the local environment. In some arrangements, video from multiple electronic portals 24 displays on the local electronic portal 24 (e.g., simultaneously in an array, serially as a slide show, combinations thereof, etc.), and the local user is able to selectively access multiple remote electronic portals via navigating a menu (also see FIG. 6).

At 204, the conferencing system 20 detects a user gesture within the local environment while the video of the local environment is electronically conveyed from the local conferencing equipment to the remote conferencing equipment and while the audio of the local environment is electronically muted. The user gesture (e.g., a user stepping into an engagement zone, a user hand wave, a voice command, etc.) is detected electronically in a contactless manner.

At 206, the conferencing system 20 electronically unmutes the audio of the local environment in response to detection of the user gesture within the local environment. In particular, the audio of the local environment is no longer blocked, but is instead output by the remote conferencing equipment, and vice versa. Accordingly, the users at each electronic portal 24 are able to engage a conversation. During such a conferencing session, the user are able to share content from other sources, e.g., a document, a slide, etc. (also see FIG. 6).

At 208, the conferencing system 20 automatically re-mutes the audio in response to a determination that, for at least a predefined amount of time, the users have vacated their respective engagement zones. Alternatively, a user may expressly terminate the audio (e.g., by saying a verbal command, by pressing a button, etc.).

As described above, improved techniques are directed to performing conferencing operations using electronic portals 24 at different locations 22. In particular, such electronic portals 24 continuously exchange video of their respective locations 22 thus providing the "feel" of being in the same office even though the electronic portals 24 reside in different locations 22 (e.g., different floors/wings of a building, different buildings of the same campus, different towns/states/countries entirely, etc.). However, the electronic portals 24 do not continuously exchange audio of their respective locations 22 thus avoiding nuisance noise. Rather, when an electronic portal 24 at one location 22 detects a particular user gesture within a local environment of that location 22 (e.g., the user entering an engagement zone, a hand wave, a recognized voice command, etc.), the electronic portal 24 unmutes the audio between electronic portals 24 thus enabling the electronic portals 24 to share audio. Such operation of electronic portals 24 enables colleagues at the different locations 22 to feel closer to each other, i.e., as if they are working "under the same roof." Moreover, such operation of electronic portals 24 enables colleagues to engage in informal sidebar conversations, e.g., when people at different locations 22 happen to walk by the electronic portals 24 in a manner similar to that of bumping into each other in the hallway. Accordingly, such electronic portals 24 promote communication between teams and provide opportunities for greater working efficiencies than distributed teams which communicate less frequently.

Additionally, one should appreciate that the above-described techniques amount to more than simply providing an online meeting. Rather, the techniques involve electronic detection of events (e.g., user gestures) to improve operation of a conferencing system 20. In particular, the conferencing system 20 shares video in an ongoing manner and unmutes audio automatically in response to detection of such events. Accordingly, there is significant improvement to technology as well as the overall user experience.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the conferencing system 20 such as the web conferencing server 26 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, it should be understood that the electronic portal 24 was described above as having an appliance form factor by way of example only. In other arrangements, the electronic portal 24 is formed by one or more separate components mounted to the wall, residing on the floor, and/or sitting on a desk, e.g., a 55-inch wall mounted television with built-in speakers, a 1080p webcam, a properly configured and provisioned computer, etc.

It should be understood that, with the electronic portals 24, the "always on" video fed to each location allows users to quickly see who is around passively as if they were there and quickly move to talking as necessary. Additionally, the life-size scale makes it obvious to each user that he or she is talking with another human rather than a small face in a little box at the top of a small screen as in some conventional online meetings (e.g., there is more opportunity for serendipitous meetings and for conveyance of non-verbal immersive and natural cues between parties). Furthermore, the "always on" video makes it effortless to know who's around and to pull people into a conversation simply by speaking to them. Also, the automatic unmuting and muting of audio makes the equipment at each location 22 more like a window or portal into a remote location 22. Such modifications and enhancements are intended to belong to various embodiments of the disclosure.

What is claimed is:

1. A method of performing electronic conferencing operations, the method comprising:
   electronically conveying video of a local environment from local conferencing equipment to remote conferencing equipment while electronically muting audio of the local environment;
   while the video of the local environment is electronically conveyed from the local conferencing equipment to the remote conferencing equipment and while the audio of the local environment is electronically muted, detecting a user gesture within the local environment, the user gesture being detected electronically in a contactless manner; and
   in response to detection of the user gesture within the local environment, electronically unmuting the audio of the local environment;
   wherein the local conferencing equipment includes a local set of cameras to acquire the video of the local environment, a local set of microphones to acquire the audio of the local environment, and local control circuitry;
   wherein detecting the user gesture within the local environment includes electronically sensing, by the local control circuitry, occurrence of a physical event within the local environment; and
   wherein (i) images of the local environment are captured by the local set of cameras of the local conferencing equipment and rendered by the remote conferencing equipment and (ii) sound from the local environment is captured by the local set of microphones of the local conferencing equipment and blocked from being output by the remote conference equipment before and during electronically sensing the occurrence of the physical event within the local environment.

2. A method as in claim 1 wherein the local control circuitry includes a depth sensor; and
   wherein electronically sensing the occurrence of the physical event within the local environment includes detecting, as the physical event, movement of a user into an engagement zone which is monitored by the depth sensor.

3. A method as in claim 1 wherein the local control circuitry includes recognition circuitry; and
   wherein electronically sensing the occurrence of the physical event within the local environment includes recognizing, as the physical event and by the recognition circuitry, a user's hand wave gesture.

4. A method as in claim 1 wherein the local control circuitry includes recognition circuitry; and
   wherein electronically sensing the occurrence of the physical event within the local environment includes recognizing, as the physical event and by the recognition circuitry, particular speech provided by a user.

5. A method as in claim 1 wherein the local conferencing equipment further includes (i) a large display screen disposed and operative in a portrait orientation in which a measured height of the large display screen is greater than a measured width of the large display screen while the large display screen is disposed and operating in the portrait orientation and (ii) a local set of speakers; and wherein the method further comprises:

outputting, by the large display screen, video acquired from a remote set of cameras of the remote conferencing equipment, and outputting, by the local set of speakers, audio acquired from a remote set of microphones of the remote conferencing equipment.

6. A method as in claim 5 wherein outputting the video acquired from the remote set of cameras of the remote conferencing equipment includes:

rendering, on the large display screen of the local conferencing equipment, images of a remote environment, the remote environment being proximate to the remote conferencing equipment and distant to the local conference equipment, and the local environment being proximate to the local conferencing equipment and distant to the remote conference equipment.

7. A method as in claim 6 wherein rendering the images of the remote environment occurs while the video of the local environment is electronically conveyed from the local conferencing equipment to the remote conferencing equipment regardless of whether the audio of the local environment is electronically muted.

8. A method as in claim 6 wherein outputting the audio acquired from the remote set of microphones of the remote conferencing equipment includes:

providing, from the local set of speakers of the local conferencing equipment, sound from the remote environment.

9. A method as in claim 8 wherein providing the sound from the remote environment occurs after electronically sensing occurrence of the physical event within the local environment.

10. A method as in claim 8 wherein providing the sound from the remote environment occurs after electronically sensing occurrence of a physical event within the remote environment.

11. A method as in claim 8, further comprising:

outputting, as a notification, an audio alert immediately before providing the sound from the remote environment.

12. A method as in claim 1, further comprising:

after the audio of the local environment is electronically unmuted so that both audio and video of the local environment are electronically conveyed from the local conferencing equipment to the remote conferencing equipment, electronically re-muting the audio of the local environment in response to an event.

13. A method as in claim 12 wherein electronically re-muting occurs in response to a determination that, for at least a predefined amount of time, (i) a local user has left a local engagement zone of a local environment for the local conferencing equipment and (ii) a remote user has left a remote engagement zone of a remote environment for the remote conferencing equipment.

14. A method as in claim 1, further comprising:

providing a menu of multiple remote environments;

after the menu is provided, receiving a selection of a particular remote environment of the multiple remote environments; and in response to selection of the particular remote environment, displaying video of the particular remote environment, the remote conferencing equipment residing at the particular remote environment.

15. A method as in claim 1, further comprising:

after the audio of the local environment is electronically unmuted, receiving a content access command by the local control circuitry; and in response to the content access command, simultaneously outputting content on local conference equipment and the remote conferencing equipment.

16. A method as in claim 1 wherein electronically unmuting the audio of the local environment occurs during a first period of time; and wherein electronically conveying the video of the local environment from the local conferencing equipment to the remote conferencing equipment while electronically muting audio of the local environment includes:

prior to electronically unmuting the audio of the local environment, outputting no sound from the local conferencing equipment to the remote conference equipment for a second period of time in a manner that provides the remote environment with a sense of being adjacent to the local environment without disturbing the remote environment with noise from the local environment, the second period of time being longer than the first period of time.

17. A method as in claim 16, further comprising:

during the second period of time that is longer than the first period of time, electronically conveying video of the remote environment from the remote conferencing equipment to the local conferencing equipment while electronically muting audio of the remote environment in a manner that provides the local environment with a sense of being adjacent to the remote environment without disturbing the local environment with noise from the remote environment.

18. A method as in claim 1 wherein electronically unmuting the audio of the local environment includes:

in response to the user gesture, unblocking, as the audio of the local environment, sound captured from the local set of microphones of the local conferencing equipment from being output by the remote conferencing equipment.

19. A method as in claim 18 wherein the local control circuitry initially blocks transmission of an audio feed from the local set of microphones; and wherein unblocking the sound captured from the local set of microphones in response to the user gesture includes transmitting the audio feed to the remote conferencing equipment.

20. A method as in claim 18 wherein the remote conferencing equipment initially prevents output of the sound captured from the local set of microphones; and wherein unblocking the sound captured from the local set of microphones in response to the user gesture includes directing the remote conferencing equipment to output the sound captured from the local set of microphones.

21. A method as in claim 18 wherein a web conferencing server initially prevents output of the sound captured from the local set of microphones; and wherein unblocking the sound captured from the local set of microphones in response to the user gesture includes directing the web conferencing server to transmit the audio feed to the remote conferencing equipment.

22. A method as in claim 1 wherein electronically unmuting the audio of the local environment includes:

in response to the user gesture, simultaneously (i) unblocking, as the audio of the local environment, sound captured from the local set of microphones of the local conferencing equipment from being output by the remote conferencing equipment, and (ii) unblocking sound captured from the remote set of microphones of the remote conferencing equipment from being output by the local conferencing equipment.

23. A computer program product having a non-transitory computer readable medium that stores a set of instructions to perform electronic conferencing operations; the set of instructions, when carried out by local conferencing equipment, causing the local conferencing equipment to perform a method of:
   electronically conveying video of a local environment from the local conferencing equipment to remote conferencing equipment while electronically muting audio of the local environment;
   while the video of the local environment is electronically conveyed from the local conferencing equipment to the remote conferencing equipment and while the audio of the local environment is electronically muted, detecting a user gesture within the local environment, the user gesture being detected electronically in a contactless manner; and
   in response to detection of the user gesture within the local environment, electronically unmuting the audio of the local environment;
wherein the local conferencing equipment includes a local set of cameras to acquire the video of the local environment, a local set of microphones to acquire the audio of the local environment, and local control circuitry;
wherein detecting the user gesture within the local environment includes electronically sensing, by the local control circuitry, occurrence of a physical event within the local environment; and
wherein (i) images of the local environment are captured by the local set of cameras of the local conferencing equipment and rendered by the remote conferencing equipment and (ii) sound from the local environment is captured by the local set of microphones of the local conferencing equipment and blocked from being output by the remote conference equipment before and during electronically sensing the occurrence of the physical event within the local environment.

24. Local conferencing equipment, comprising:
a communications interface;
memory; and
control circuitry coupled to the communications interface and the memory, the memory storing instructions that, when carried out by the control circuitry, cause the control circuitry to:
   electronically convey video of a local environment from the control circuitry of the local conferencing equipment to remote conferencing equipment through the communications interface of the local conferencing equipment while electronically muting audio of the local environment;
   while the video of the local environment is electronically conveyed to the remote conferencing equipment and while the audio of the local environment is electronically muted, detect a user gesture within the local environment, the user gesture being detected electronically in a contactless manner; and
   in response to detection of the user gesture within the local environment, electronically unmute the audio of the local environment;
wherein the local conferencing equipment further comprises a local set of cameras to acquire the video of the local environment, and a local set of microphones to acquire the audio of the local environment;
wherein the control circuitry, when detecting the user gesture within the local environment, is operative to electronically sense occurrence of a physical event within the local environment; and
wherein (i) images of the local environment are captured by the local set of cameras of the local conferencing equipment and rendered by the remote conferencing equipment and (ii) sound from the local environment is captured by the local set of microphones of the local conferencing equipment and blocked from being output by the remote conference equipment before and during electronically sensing the occurrence of the physical event within the local environment.

* * * * *